Feb. 8, 1966     R. M. EGGEN     3,233,815
PACKAGING
Filed Feb. 28, 1963     2 Sheets-Sheet 1
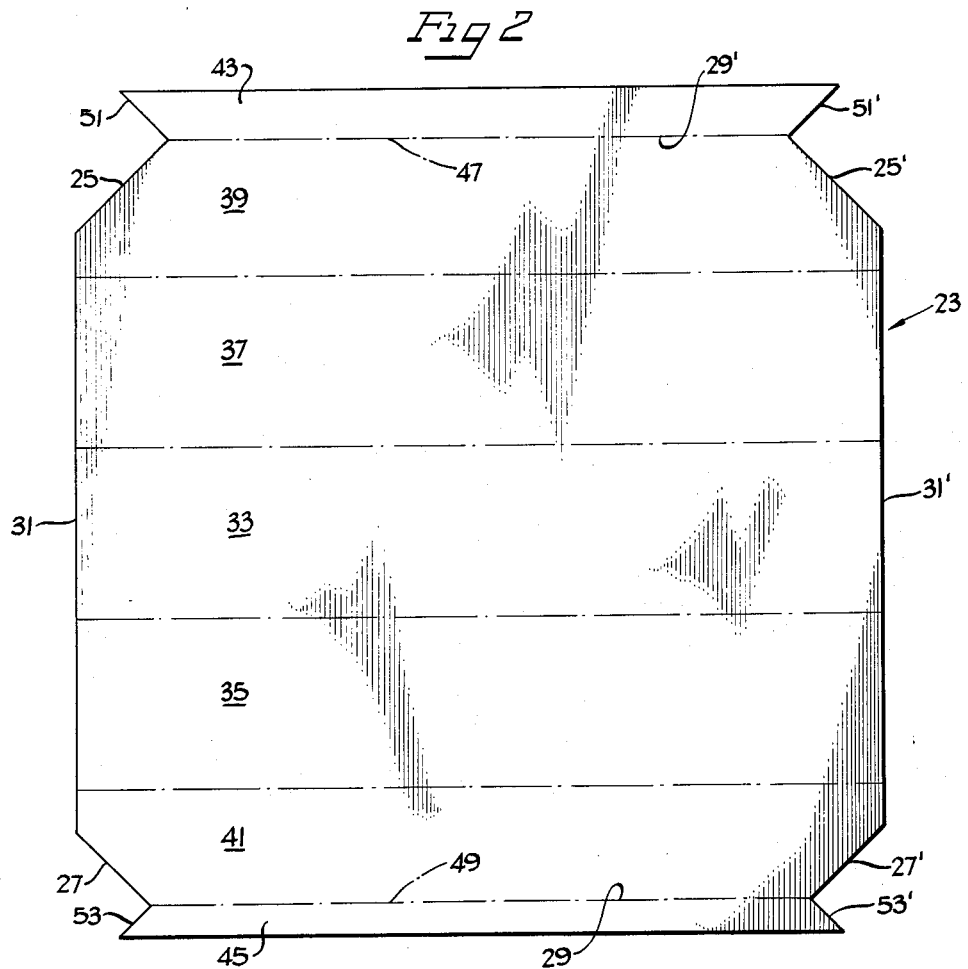
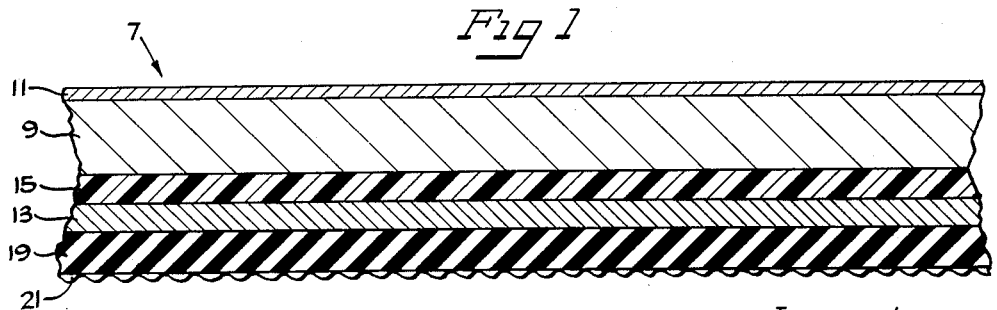
Inventor
Rex M. Eggen
By
Anderson, Luedeka, Fitch, Even & Tabin
Attys Feb. 8, 1966 R. M. EGGEN 3,233,815
PACKAGING
Filed Feb. 28, 1963 2 Sheets-Sheet 2
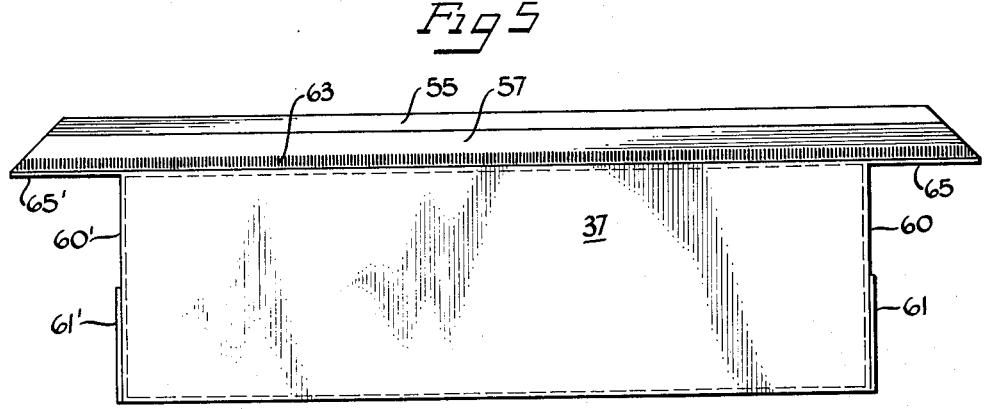
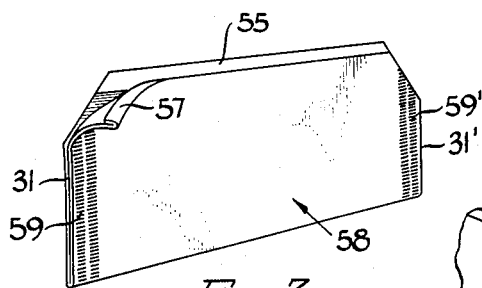
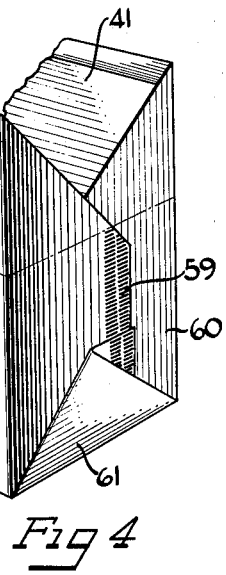
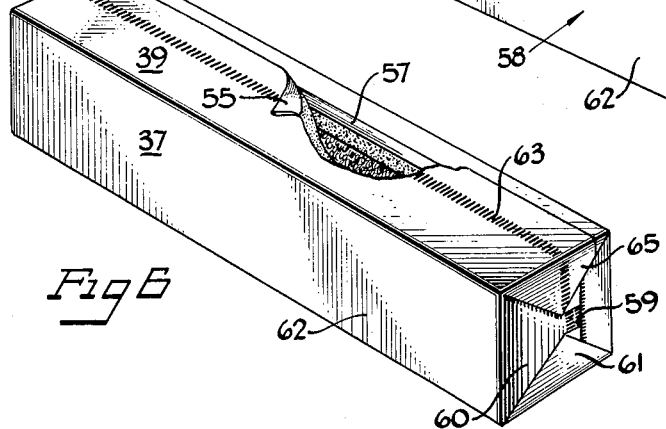
Inventor
Rex M. Eggen
By
Anderson, Luedeka, Fitch, Even & Tabin
Attys

United States Patent Office 3,233,815
Patented Feb. 8, 1966

3,233,815
PACKAGING
Rex M. Eggen, Beaver Dam, Wis., assignor to National Dairy Products Corporation, Chicago, Ill., a corporation of Delaware
Filed Feb. 28, 1963, Ser. No. 261,640
2 Claims. (Cl. 229—87)

The present invention relates generally to flexible food containers and more particularly to an improved flexible laminated wrapper for cream cheese and to an improved package fabricated from the laminated wrapper.

A wrapper for packaging cream cheese must be able to withstand hot packing temperatures. It must also resist the acidity of the cheese, effectively block the entrance of light into the interior of the package, and keep moisture from leaking through the walls and seams of the wrapper. Additionally, it is desirable for the package to be reclosable since cream cheese is sold in portions which are normally not consumed in their entirety after being initially opened.

Various types of wrapping materials, laminated and unlaminated, have been employed in attempts to achieve a more desirable wrapper for cream cheese. These wrappings have, for example, been fabricated from plastic films, metal foils, such as aluminum foil, cellophane, wax, etc., or laminations of two or more of these or similar materials. All of the presently known wrappers for cream cheese and similar type products are not entirely satisfactory for one reason or another. Various of the currently available wrappers are subject to various disadvantages. While no wrappers are subject to all of the following disadvantages, most wrappers generally have one or more disadvantages. Foil wrappers may have holes therein which permit leakage of moisture out of the wrapper and air into the package. Some wrappers have an undesirable taste which is picked up by the cheese. The wrapper may be subject to deterioration by attack of the acid within the cheese. Additionally the wrapper may become deformed or have its properties impaired during hot packing of the cheese. Many of the laminated wrappers are subject to delamination of the various layers that form the wrapper when the package is opened and closed.

It is therefore a principal object of the present invention to provide an improved laminated wrapper for cream cheese and the like which is not subject to the aforementioned disadvantages. It is a further object of the present invention to provide an improved package fabricated from the laminated wrapper. Another object of the present invention is to provide an improved wrapper for the protection of cream cheese against spoilage which is readily removable from the cream cheese without tearing and without clinging to the cheese and which is readily resealable therearound to protect the remaining cheese from subsequent deterioration. It is also an object of the present invention to provide a food wrapper and package consisting of a laminated wrapper of metal foil, cellophane and a pressure resealable and resealable coating material which will not exhibit pronounced dimensional distortion at temperatures up to 190° F. An additional object is to provide an improved resealable package having tabs of uneven width to facilitate separation of the pressure resealable surfaces.

Further objects and advantages of the present invention will be apparent from a study of the following detailed description and the accompanying drawings of which:

FIGURE 1 is an enlarged fragmentary sectional view of a wrapper incorporating various features of the present invention;

FIGURE 2 is a plan view of a preferred embodiment of a blank for a package incorporating features of the present invention;

FIGURE 3 is a perspective view of the blank of FIGURE 1 folded into a pouch;

FIGURE 4 is a perspective view of the pouch of FIGURE 3 formed into a rectangular package with the top flap opened;

FIGURE 5 is a side view of the package of FIGURE 4 with the top flap partially closed; and FIGURE 6 is a perspective view of the pouch of FIGURE 3 when filled with and sealed about an item of food.

A wrapper formed in accordance with the present invention, as more fully described hereinafter, has a superior appearance, acts as a substantially complete vapor barrier to moisture, reducing the "weeping" of moisture out of a packaged cheese product, and provides a package which can be conveniently opened and resealed several times without failure or delamination of the wrapper. The various features of the wrapper cooperate together to provide a superior wrapper for cheese and similar food products when compared to presently available wrappers.

In general, the wrapper shown by the accompanying drawings, consists of a lamination of metallic foil and dissimilar synthetic films and coatings. In constructing the wrapper, the outer surface of the metallic foil is coated with a synthetic film or lacquer in order that the foil will accept printing. However, this is not considered an essential element of the invention. The inner surface of the foil is bonded to a layer of regenerated cellulose, e.g., cellophane, by an intermediate layer of a thermoplastic bonding material which will adhere to both the foil and the cellophane and which is of a type that will provide a moisture barrier for the lamination. The inner surface of the cellophane is coated with a pressure-sealable and resealable coating material which may or may not be treated with a release agent such as a dusting starch. The thickness of the different layers of the lamination are selected so that the finished wrapper is sufficiently heavy and durable to mechanically protect the cream cheese or other foodstuff wrapped therein against dimensional distortion.

The lamination as generally described provides a wrapper which has improved retention of moisture within the wrapper and an improved resistance to delamination during opening and closing of a wrapper constructed from the described lamination. The cellophane or regenerated cellulose layer within the lamination provides the strength necessary to withstand the stresses of opening and closing the package. In prior wrappers the cellophane has been placed exterior of the metallic foil, and due to the superior tensile strength of the cellophane, it often delaminates from the foil in laminations of this type leaving the foil stuck to the cheese or other food product. When the cellophane is placed interiorly of the foil, the cellophane supports the foil during opening and closing of the package, and substantially eliminates the tendency of the foil and cellophane to delaminate. The provision of the thermoplastic bonding material between the cellophane and metallic foil prevents any moisture that might leak through the cellophane from seeping between the cellophane and foil until it reaches a microscopic hole in the foil through which it can escape.

Now referring more particularly to FIGURE 1 of the accompanying drawings, a preferred embodiment of the laminated wrapper 7 has an outer layer 9 of metal foil, such as aluminum foil or the like, of suitable thickness. The metal foil selected for use in the laminated wrapper must have sufficient strength and durability to provide dimensional stability to the finished package. It has been found that an aluminum foil of from about 0.0002 to 0.0006 and preferably about 0.0004 inch in thickness will provide the required strength, but any other thickness of foil may be considered suitable depending upon conditions.

The foil need not be coated on its exterior surface, but is preferably coated with an ink receptive material 11, such as vinyl plastic or a suitable lacquer, in order that the finished package can be printed with an attractive label etc. While any suitable compound can conveniently be employed, it has been found that a thin coating of vinyl chloride having a thickness of from 5 to 10 percent of the thickness of the metal foil is particularly advantageous.

The inner surface of the metal foil is sealed and bonded to a coextensive layer 13 of cellophane or similar regenerated cellulose film by an intermediate layer 15 of thermoplastic bonding agent, preferably polyethylene plastic, which adheres well to both the uncoated surface of the metal foil and to the cellophane. The regenerated cellulosic, e.g., cellophane, may be of any suitable thickness which has sufficient strength to withstand the stresses applied to the wrapper during the opening of the package. Cellophane which is commercially known as 180 to 210 MAT, preferably about 195 MAT, corresponding to about 10 pounds per ream, has been found to have a suitable strength.

Polyethylene is a suitable thermoplastic bonding agent for the foil and cellophane, and a polyethylene of between about 10 and 15 pounds per ream, preferably about 15 pounds per ream, of surface to be bonded has been found to provide a strong lamination that is capable of withstanding the stresses of opening and closing the wrapper. Alternately, any other thermoplastic bonding agent that provides sufficient strength can also be employed.

The unbonded or inner side of the cellophane or regenerated cellulosic film is desirably coated with a layer 19 of a pressure sealable and resealable coating material.

The pressure sealable and resealable coating material is preferably a wax containing coating material which readily releases from the surface of the product which is to be enclosed in the wrapper. One example of such a coating for use in packaging soft cheeses and other refrigerated products is the mixture of rubber, paraffin wax and microcrystalline wax set forth in U.S. Patent No. 2,339,242 to Abrams et al. In place thereof, wax coating compositions, including a coating material of microcrystalline wax, aluminum distearate and ester gum, such as are described in U.S. Patent No. 2,348,689 to Abrams et al., or microcrystalline wax and paraffin wax coating materials substantially as set forth in U.S. Patent No. 2,753,275 to Wiles et al. can be utilized. In each instance, the particular coating material is selected on the basis of its sealing and resealing properties and also its ability to withstand the hot packaging temperature of the product being wrapped. In wrapping cream cheese, the coating material should have a melting point in excess of the hot packing temperature. In addition the coating material should retain desirable properties at refrigeration temperatures.

One particularly advantageous wax coating material is marketed under the registered U.S. Trademark of Parakote by the Marathon Corporation. Parakote F-624, comprises a mixture of 18 percent by weight of pale crepe rubber, 8 percent by weight of an ester gum, 44 percent by weight of a microcrystalline wax, e.g., amorphous wax, which has a melting point of 165° F., and 30 percent of a paraffin wax which has a melting point of 145° F. The coating material has a viscosity of not less than 8,000 seconds (50 cc. measured on a Scott viscosimeter at 90° C.) and is particularly suitable for use in a wrapper utilized on hot packed cream cheese packaged at about 165° F. This coating material when at a level of 25 pounds per ream has been found to provide satisfactory sealing and resealing properties to the finished wrapper.

The exposed surface of the sealable and resealable coating material 19 may be covered with a release agent 21, such as a starch powder, which is substantially free of bacteria, to enable the finished package to be easily opened. About 4 pounds of starch powder per ream of surface area treated has been found to be a suitable amount.

The laminated wrapper, as described, has been found to be particularly advantageous for wrapping soft dairy products, such as cream cheese and the like, which are hot packed at temperature in excess of 150° F. Neither the foil nor the cellophane is in direct contact with the product, and the coating material treated with starch powder is readily separable from the surface of the product.

One of the important features of the laminated wrapper is the interposition of the cellophane film 13 between the metal foil 9 and the product to be wrapped, e.g., cream cheese. Cellophane for wrapping has a greater tensile strength than does metal foil of corresponding thickness, and in laminations where the cellophane is placed on the outside of the metal foil it tends to delaminate from the foil when the package is opened and closed. However, when the cellophane is placed inwardly of the foil, in respect of the product delamination does not occur upon repeated opening and closing of the wrapper. This is a particularly desirable feature for cheese wrappers, since cheese is usually sold in packages containing a greater amount of cheese than is normally consumed at one time, and the wrapper is opened and closed several times before all of the cheese is consumed.

The various components of the wrapper can be laminated together in a suitable manner, by known means, and the particular means chosen does not form a part of the present invention.

Although the wrapper shown in the drawings may be employed to package already shaped products in a conventional manner, the wrapper is particularly adapted to be used in the hot packaging of cream cheese or other similar soft foods which are packaged while in a fluid condition at temperatures above ambient temperature.

Referring now to FIGURE 2, there is shown a preferred embodiment of a blank 23 made from the wrapper previously described. Blank 23 is generally octagonal in shape and has alternating short sides 25, 25', 27 and 27' and long sides 29, 29', 31 and 31'. Sides 29, 29' 31, and 31' may be of substantially equal length, while sides 25 and 25' are preferably slightly longer than the sides 27 and 27' in order to form an easily openable seal explained more fully hereinafter. Disposed within the octagonal shape and between opposite sides 29 and 29' are areas 33, 35, 37, 39 and 41. Area 33 generally defines the top of a finished package (FIGURE 6) made from the blank 23 and areas 35 and 37 generally define the sides of the finished package. The areas 39 and 41 are adjacent to areas 37 and 35 respectively and, when in an assembled relationship, comprise the bottom of the finished package.

Areas 39 and 41 have angular sides formed by the short sides 25 and 25' and 27 and 27', respectively. Flaps 43 and 45 are attached to the outer extremities of areas 39 and 41, respectively. As shown in FIGURE 2, flap 43, which is adjacent area 39 and the longer sides 25 and 25', is slightly wider than flap 45 adjacent area 41. Flaps 43 and 45 are adapted to be folded upon areas 39 and 41 along the fold lines 47 and 49. Flaps 43 and 45 have angular sides 51 and 51' and 53 and 53' which are cut so as to lie along sides 25 and 25' and 27 and 27' when the flaps 43 and 45 are folded upon the areas 39 and 41.

The blank 23, as shown in FIGURE 2, is arranged so that the coating material 19, previously described, is placed on the upper surface thereof and covers the entire upper surface area of the blank, including flaps 43 and 45. When the flaps 43 and 45 are folded back onto areas 39 and 41 and a slight pressure is applied thereto the flaps become adhesively affixed to areas 39 and 41, forming tabs 55 and 57 (FIGURE 3), as more fully described hereinafter.

The blank 23 can be employed as a package for various foodstuffs, and is particularly suitable for the hot packing of cream cheese. As seen in FIGURE 3, blank 23 can be formed into a pouch 58 by folding the blank 23 to cause the coating material to be in face to face relation and forming side fin seals 59, 59' along the edges of sides 31 and 31'. The provision of sides 25 and 25' and 27 and 27' of unequal length, and flaps 43 and 45 of unequal width, cause tabs 55 and 57, to have their marginal edges spaced apart when the tabs 55 and 57 are in an abutting relationship.

The pouch 58 may be placed in a suitable rectangular mold, (not shown) and filled with cream cheese or the like. The pouch is filled with the cream cheese while in an open position, as seen in FIGURE 4. The fin seals 59 and 59' are folded upon ends 60 and 60' of the package resulting in bottom end flaps 61 and 61' which are folded upwardly against ends 60 and 60'. That portion of the blank defined by areas 39 and 41 (FIGURE 4) are in an open position allowing the filling of the pouch 58.

As shown in FIGURE 5, the rectangularly shaped package containing the cream cheese may be partially closed after filling by bringing areas 39 and 41 into an abutting relationship. A top fin seal 63 is then formed below the tabs 55 and 57 by suitable heat sealing means, thereby forming top end flaps 65 and 65'. As can be seen in FIGURE 6, to fully close the package the abutting tabs 55 and 57 are folded toward one edge of the package so that the wider tab 55 overlies tab 57 with their marginal edges spaced apart. Top end flaps 65 and 65' are then folded downwardly against ends 60 and 60'. After the package has been fully closed, the end flaps 61, 61', 65, and 65' are pressed against the ends 60 and 60' to provide a substantially air tight and moisture proof package.

When it is desired to open a sealed package the end flaps 61 and 65, and 61' and 65' are brought to the position shown in FIGURE 5. The tabs 55 and 57 are then grasped with the fingers and pulled apart. The edges of the tabs are spaced apart and are readily grasped by the fingers. The tabs do not stick to one another since the inner faces thereof have foil surfaces which are not coated with the coating material 19. The tabs may be pulled apart, opening the top fin seal 63 and opening the package by causing it to assume the position shown in FIGURE 4. The cheese or other food is then fully exposed and is easily removed from within the package.

After the cheese or other food has been removed the package is readily resealable and reopenable without delamination or tearing of the wrapper. During resealing, the package is first partially closed, as shown in FIGURE 5 and then fully closed, as shown in FIGURE 6, in the manner previously described, the coating material employed being of a nature that it readily forms an impervious seam upon the application of a slight amount of pressure.

Accordingly, an improved package is provided which includes an inner surface of a readily sealable and resealable coating material and overlapping tabs of unequal width which facilitate the opening of the package. Certain features of the present invention are illustrated in the following example.

*Example*

A wrapper for 10 ounce sticks of hot packed cream cheese is made from 0.004 inch thick aluminum foil coated on the dull side with 0.00001 inch thick vinyl plastic and laminated on the opposite uncoated shiny side to cellophane, having a basis weight of 10 pounds per ream, using 15 pounds per ream of polyethylene plastic as the bonding material. The exposed face of the cellophane is coated with 25 pounds per ream of the previously described Parakote F-624 dusted over with 4 pounds per ream of starch.

A wrapper of a shape as illustrated by FIGURE 2 is assembled into a pouch, as shown in FIGURE 3 by heat sealing the edges thereof. The pouch is placed in a rectangular form and about 10 ounces of molten cream cheese at 165° F. is introduced into the pouch. The open portion of the filled pouch is folded over in the previously described manner, bringing up the tabs into an abutting position. A seal is then provided just below the tabs by a heat sealing operation. The filled package is then removed from the form and the end flaps are folded and pressed against the package.

It is found that the minimum shelf life of the packaged hot packed cream cheese is over 60 days under normal refrigeration (45° F. or less). The product could be kept for as long as 60 days at room temperature (70°) without any indication of observable mold or yeast. The package precluded air from contacting the cheese. No significant leakage of moisture could be detected from properly sealed packages. Moreover, it was found that the packages could be readily opened and then reclosed, after partial use of the cheese, without tearing or delaminating the wrapper. It is found that an effective seal could be reestablished around the cheese upon reclosing the package. It was further found that the package was much heavier than the usual cream cheese package and afforded greater protection of the cheese in handling, minimizing dimensional distortion of the cheese.

The preceding example clearly establishes advantages of both the wrapper of the present invention and the package formed therefrom. Effective long-term protection of food products against deterioration is provided, even upon opening and resealing the package. The package is easy to open and reseal and affords mechanical protection against damage to the food product stored therein.

Although the preceding explanation has necessarily been of a detailed nature in order to completely describe the laminated wrapper and package, it is intended that the invention be limited only by the appended claims.

What is claimed is:

1. An improved blank for a rectangular package comprising, a generally octagonal shaped wrapper having four short sides and four long sides, each of said short and long sides being parallel to and directly opposite from a like short and long side, flaps attached to and extending beyond the extremity of each of two opposed of said long sides adapted to be folded interiorly of said wrapper along fold lines coincident with said long sides to which said flaps are attached to form multi-ply tabs, one of said flaps being wider than the other of said flaps to cause said tabs to be of different width, said short sides adjacent said wider flap being longer than said short sides adjacent said narrow flap, said long side to which said narrower flap is attached being longer than said long side to which said wider flap is attached, said tabs being adapted to abut one another with the marginal edges thereof spaced apart to provide opening means when said blank is formed into a rectangular package in a manner so that said short sides adjacent said wider flap abut and are coextensive with said short sides adjacent said narrower flap, whereby a package formed from said blank is easily opened with the fingers.

2. A package in accordance with claim 1 wherein said wrapper is formed from a lamination comprising an outer layer of metal foil, an inner sealable and resealable layer of rubber, microcrystalline wax and paraffin wax and an intermediate layer of cellophane disposed between said metal foil layer and said sealable and resealable layer.

References Cited by the Examiner

UNITED STATES PATENTS 2,055,333  9/1936  Burke _____ 229—87 X
2,214,997  9/1940  Guyer.
2,262,111  11/1941  Moore.

(Other references on following page)

| | | | | | |
|---|---|---|---|---|---|
| 2,304,591 | 8/1942 | Pape et al. | 2,902,396 | 9/1959 | Reynolds. |
| 2,400,390 | 5/1946 | Clunan _____ 206—46 | 2,944,586 | 7/1960 | Yanulis _____ 161—249 X |
| 2,415,387 | 2/1947 | Graebner et al. | 2,951,765 | 9/1960 | Robson _____ 206—46 |
| 2,428,478 | 10/1947 | Thurber. | 3,075,864 | 1/1963 | Anderson _____ 161—234 X |
| 2,541,689 | 2/1951 | Carson _____ 161—234 | | | |
| 2,551,087 | 5/1951 | Barnhart et al. | | | |
| 2,778,760 | 1/1957 | Hurst _____ 161—234 | | | |
| 2,870,954 | 1/1959 | Kulesza. | | | |

JOSEPH R. LECLAIR, *Primary Examiner.*

FRANKLIN T. GARRETT, GEORGE O. RALSTON,
*Examiners.*